United States Patent
Santiz et al.

(10) Patent No.: US 12,310,333 B2
(45) Date of Patent: May 27, 2025

(54) DOG HARNESS ASSEMBLY FOR VEHICLE

(71) Applicant: Ford Global Technologies, LLC, Dearborn, MI (US)

(72) Inventors: Mara Santiz, Saline, MI (US); Kevin Pline, Plymouth, MI (US); Derek Board, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 18/177,986

(22) Filed: Mar. 3, 2023

(65) Prior Publication Data

US 2024/0292815 A1    Sep. 5, 2024

(51) Int. Cl.
*A01K 27/00* (2006.01)
*B60R 22/10* (2006.01)

(52) U.S. Cl.
CPC ............ *A01K 27/002* (2013.01); *B60R 22/10* (2013.01)

(58) Field of Classification Search
CPC .............................. A01K 27/002; B60R 22/10
See application file for complete search history.

(56) References Cited

U.S. PATENT DOCUMENTS

| | | | | |
|---|---|---|---|---|
| 5,167,203 A | * | 12/1992 | Scott | A01K 27/002 297/485 |
| 5,915,335 A | * | 6/1999 | Holt, Jr. | A01K 1/0263 119/770 |
| 8,622,431 B2 | | 1/2014 | Singh | |
| 9,295,234 B2 | | 3/2016 | Shewfelt | |
| 10,189,435 B2 | | 1/2019 | Templeton | |
| 11,324,201 B1 | * | 5/2022 | Benishai | A01K 27/002 |
| 2004/0025804 A1 | * | 2/2004 | Smith | B60R 22/10 119/856 |
| 2013/0047934 A1 | * | 2/2013 | Morris | B60R 22/10 119/771 |
| 2013/0092100 A1 | * | 4/2013 | Davis | B60R 22/10 119/771 |
| 2013/0284113 A1 | * | 10/2013 | Aaron | B60R 22/10 119/771 |
| 2014/0305384 A1 | * | 10/2014 | Ramirez | A01K 27/002 119/771 |

(Continued)

FOREIGN PATENT DOCUMENTS

EP    1607284 A1 * 12/2005    ............. B60R 22/10

OTHER PUBLICATIONS

Machine Translation of EP-1607284-A1, Neuville R, Dec. 21, 2005 (Year: 2005).*

(Continued)

*Primary Examiner* — Tien Q Dinh
*Assistant Examiner* — Katherine June Walter
(74) *Attorney, Agent, or Firm* — Frank A. MacKenzie; Brooks Kushman P.C.

(57) ABSTRACT

A dog harness assembly includes a dog harness having a chest strap and a back strap releasably engageable with the chest strap around a dog. The dog harness assembly includes a seatbelt harness releasably engageable with a seatbelt webbing of a vehicle and a seatback harness releasably engageable with a child seat anchor of a vehicle. The seatbelt harness has a clip releasably engageable with the chest strap and the seatback harness has a clip releasably engageable with the back strap.

15 Claims, 7 Drawing Sheets

(56) References Cited

U.S. PATENT DOCUMENTS

2018/0334078 A1* 11/2018 Wang .................. A01K 1/0272
2022/0234538 A1*  7/2022 Buttolo ................. B60R 22/10

OTHER PUBLICATIONS

"Dog Car Harness", https://www.kurgo.com/harnesses/impact-dog-car-harness.
"How to Use the Tru Fit Enhanced Strength Harness" Kurgo Dog Gear, YouTube, https://www.youtube.com/watch?v=tsYBRz1s_5c.

* cited by examiner

DOG HARNESS ASSEMBLY FOR VEHICLE

BACKGROUND

Dog owners may choose to travel with their dog. For example, the dog owner may travel with their dog in a vehicle, allowing the dog to sit unrestrained in the vehicle. This may allow the dog to wander about the vehicle and to interact with the dog owner while the vehicle is being operated.

DETAILED DESCRIPTION

With reference to the Figures, wherein like numerals indicate like parts throughout the several views, a dog harness assembly 12 including a dog harness 14 having a chest strap 26 and a back strap 40 releasably engageable with the chest strap 26 around a dog. The dog harness assembly 12 includes a seatbelt harness 22 releasably engageable with a seatbelt webbing 82 of a vehicle 10 and a seatback harness 24 releasably engageable with a child seat anchor 78 of a vehicle 10. The seatbelt harness 22 has a clip 60 releasably engageable with the chest strap 26 and the seatback harness 24 has a clip 66 releasably engageable with the back strap 40.

Since the dog harness 14 is releasable from the seatbelt harness 22 and the seatback harness 24, the seatbelt harness 22 and the seatback harness 24 may be left in the vehicle 10 and engaged with seatbelt webbing 82 and the child seat anchor 78, respectively, when the dog is removed from the vehicle 10. With such use, the seatbelt harness 22 and the seatback harness 24 are thus ready for re-use by connection to the dog harness 14 in a subsequent entry of the dog with the dog harness 14. The dog harness 14 may remain with the dog when the dog exits the vehicle 10. The dog harness 14 may be used to leash the dog before and during the exit of the dog from the vehicle 10.

The vehicle 10 may be any suitable type of automobile, e.g., a passenger or commercial automobile such as a sedan, a coupe, a truck, a sport utility vehicle 10, a crossover vehicle 10, a van, a minivan, a taxi, a bus, etc. The vehicle 10 includes a passenger cabin for housing passengers of the vehicle 10.

The vehicle 10 includes one or more seats 16. The vehicle 10 may include any suitable number of seats. The seats may be arranged in the passenger cabin in any suitable position, i.e., as front seats, rear seats, third-row seats, etc. The seat 16 may be movable relative to the floor to various positions, e.g., movable fore-and-aft and/or cross-vehicle 10. The seats may be of any suitable type, e.g., a bucket seat. The seat 16 shown in FIGS. 1 and 4 with the dog harness assembly 12 is a rear seat, and more specifically a rear bench seat. In other examples, the dog harness assembly 12 may be engaged with any suitable type of seat.

The seat 16 includes the seatback 74 and a seat bottom 72. The seatback 74 may be supported by the seat bottom 72 and may be stationary or movable relative to the seat bottom 72. The seatback 74 and the seat bottom 72 may be adjustable in multiple degrees of freedom. Specifically, the seatback 74 and the seat bottom 72 may themselves be adjustable, in other words, adjustable components within the seatback 74 and/or the seat bottom 72, and/or may be adjustable relative to each other. The seatback 74 and the seat bottom 72 may each include a frame and a covering. The covering may include upholstery and padding. The upholstery may be cloth, leather, faux leather, or any other suitable material. The upholstery may be stitched in panels around the frame. The padding may be between the covering and the seatback frame and may be foam or any other suitable material.

The seatback 74 and the seat bottom 72 may define an occupant seating area 76. A dog may be disposed in the occupant seating area 76, as shown in the Figures. The occupant seating area 76 may be on a front side of the seatback 74.

The seatback 74 includes the child seat anchor 78. The child seat anchor 78 is fixed to the seatback 74. For example, the child seat anchor 78 may be fixed to the frame of the seatback 74 The child seat anchor 78 is designed to transmit force from a child seat to the seatback 74 to control the position of the child seat on the seat when the child seat is engaged with the child seat anchor 78. The child seat anchor 78 may be of a type currently known. The child seat anchor 78 may be configured to comply with a standard. As an example, the child seat anchor 78 may be configured to comply with ISOFIX, which is an international standard for attachment points for child safety seats in passenger cars. Specifically, the child seat anchor 78 may be positioned, sized, designed, etc., to comply with the standard.

The vehicle 10 includes a seatbelt assembly 80. The seatbelt assembly 80 includes a seatbelt retractor and the webbing 82 retractably payable from the seatbelt retractor. The seatbelt assembly 80 may include an anchor (not numbered) coupled to the webbing 82 and a tongue 86 that engages a buckle 84. The seatbelt assembly 80, when fastened, is designed to secure a dog against harmful movement that may result during a collision or a sudden stop of the vehicle 10. In the example shown in the Figures, the seatbelt assembly 80, in part, connects a dog to the seat 16 with the dog harness assembly 12.

The webbing 82 may extend continuously from the seatbelt retractor to the anchor. For example, one end of the webbing 82 feeds into the seatbelt retractor, and the other end of the webbing 82 is fixed to the anchor.

The webbing 82 may be fabric, e.g., woven polyester. The tongue 86 slides freely along the webbing 82 and, when engaged with the buckle 84, divides the webbing 82 into a lap belt portion and a shoulder belt portion.

The seatbelt retractor is moveable from an unlocked position to a locked position, e.g., by conventional mechanisms known in the art. In the unlocked position, the webbing 82 may be extended from and retracted into the seatbelt retractor. In the locked position, the seatbelt retractor prevents extension of the webbing 82 to limit the forward movement of the occupant. The seatbelt retractor may be in the unlocked position by default, i.e., in the absence of a sudden deceleration. The seatbelt retractor may change from the unlocked position to the locked position during a sudden deceleration of the vehicle 10, i.e., deceleration triggers components of the seatbelt retractor to change from the unlocked position to the locked position.

The seatbelt retractor may have an Automatic Locking Retractor (ALR) mode in which the seatbelt retractor remains locked. As an example, the retractor may have components that are currently known that operate the retractor in the ALR. To activate the ALR mode, the webbing 82 is completely unspooled, at which point ALR mode is activated. In ALR mode, the retractor retracts slack in the webbing 82 and does not pay out webbing 82. The ALR mode is exited by feeding all slack webbing 82 to the retractor until the webbing 82 is in a standard ready-for-use position. In the example shown in FIGS. 1 and 4, for example, the ALR mode is activated so that no webbing 82 is paid out of the retractor.

The dog harness 14 includes a bottom segment 18 and a top segment 20. The bottom segment 18 includes the chest strap 26, as introduced above, and the top segment 20 includes the back strap 40, as also introduced above. The dog harness 14 is releasably engageable with the dog. The dog harness 14 is fixed to the dog for controlling the kinematics of the dog during certain vehicle impacts, as described further below. Specifically, the dog harness 14 is releasably engageable with both the seatback harness 24 and the seatbelt harness 22. The dog harness 14 may remain with the dog when the dog exits the vehicle 10. The dog harness 14 may be used to leash the dog before and during the exit of the dog from the vehicle 10.

The bottom segment 18 and the top segment 20 are connectable to each other to releasably engage the dog harness 14 to the dog. Specifically, the chest strap 26 and the back strap 40 are connectable to each other to releasably engage the dog harness 14 to the dog. As an example, the dog harness 14 includes side straps 28, 30 between the chest strap 26 and the back strap 40. The side straps 28, 30 extend along the sides of the dog, e.g., along shoulders, ribs, etc. The side straps are designed to encircle the dog between the chest strap 26 and the back strap 40. In other words, when the dog harness 14 is engaged with the dog, the side straps 28, 30, the chest strap 26, and the back strap 40, in combination, extend endlessly around the body of the dog. When engaged with the dog, the dog harness 14 controls the kinematics of the dog during certain vehicle impacts, as described further below.

The bottom segment 18 and/or the top segment 20 may include the side straps 28, 30, specifically lower side straps 28 and upper side straps 30. The side straps 28, 30 are releasably engageable with at least one of the chest strap 26 and the back strap 40. For example, in the example shown in the Figures, the bottom segment 18 includes the side straps 28, 30 and the side straps 28, 30 are releasably engageable with the top segment 20. In such an example, the side straps 28, 30 are retained on the chest strap 26 and are releasably engageable with the chest strap 26. To engage the dog harness 14 to the dog, the back strap 40 is located on the back of the dog, the chest strap 26 is located on the chest of the dog, and the side straps 28, 30 are engaged with the chest strap 26, as described further below.

As set forth above, the back strap 40 is releasably engageable with the chest strap 26 around the dog. The dog harness 14 may include connectors 42, 44 to selectively release the side 28, 30 from one of the chest strap 26 and the back strap 40 with additional input from a dog handler to release the dog harness 14 from the dog. In the example shown in the Figures, the dog harness 14 includes connectors 42 between the back strap 40 and the lower side strap 28 and connectors 44 between the back strap 40 and the upper side strap 30. The connectors 42, 44 may be of any suitable type, e.g., a nested buckle (as shown at 42), a tri-bar buckle (as shown at 44), a side-release buckle, etc. In the example of the connector 44 being a tri-bar buckle as shown in the Figures, the connector 44 also provides for length adjustment of the lower side strap 28.

The side straps 28, 30 may include length adjusters 32 that adjust the length of the strap 28, 30 to fit the dog harness 14 to the dog. As an example, the length adjusters 32 shown in the Figures are of the type referred to as tri-glide or tri-bar buckles. In other examples, the length adjusters 32 may be of any suitable type that adjusts the length of the side strap 28, 30

The chest strap 26 is elongated along the longitudinal axis of the chest of the dog when the dog harness 14 is engaged with the dog. The dog harness 14 may include a ring 38 fixed to the chest strap 26. As described further below, the clip 60 of the seatbelt harness 22 is releasably engageable with the ring 38 on the chest strap 26. The chest strap 26 has a lower end 34 and an upper end 36. When engaged with the dog, the upper end 36 is between the head of the dog and the lower end 34, and the lower end 34 is between the tail of the dog and the upper end 36, i.e., the upper end 36 is closer to the head of the dog and the lower end 34 is closer to the tail of the dog. The ring 38 on the chest strap 26 at the upper end 36 of the chest strap 26.

The back strap 40 is elongated along the longitudinal axis of the back of the dog when the dog harness 14 is engaged with the dog. The dog harness 14 may include a ring 50 fixed to the back strap 40. As described further below, the clip 66 of the seatback harness 24 is releasably engageable with the ring 50 on the back strap 40. The back strap 40 has a lower end 46 and a upper end 48. When engaged with the dog, the lower end 46 is between the head of the dog and the upper end 48, and the upper end 48 is between the tail of the dog and the lower end 46, i.e., the lower end 46 is closer to the head of the dog and the upper end 48 is closer to the tail of the dog. The ring 50 on the back strap 40 at the upper end 48 of the back strap 40. In examples in which the ring on the back strap 40 is at the upper end 48 of the back strap 40 and the ring 38 on the chest strap 26 is at the upper end 36 of the chest strap 26, the placement of the rings 38, 50 at the respective upper end 36, 48 provides flexibility for engaging and disengaging the dog harness 14 from the seatbelt harness 22 and the seatback harness 24.

The straps of the dog harness 14 may be, for example, fabric such as woven polyester. The straps may include any suitable padding, body-fitting contouring, etc.

The seatbelt harness 22 is releasably engaged with the seatbelt webbing 82 and is releasably engageable with the dog harness 14, specifically the chest strap 26 of the bottom segment 18 of the dog harness 14. In use, the seatbelt harness 22 may be released from the dog harness 14 to allow the dog to exit the vehicle 10. At the option of the dog handler, the seatbelt harness 22 may remain in the vehicle 10 and engaged with the seatbelt webbing 82 for future use. In such a future use, the dog harness 14 may be re-engaged with the seatbelt harness 22 to, in part, secure the dog to the vehicle 10 seat.

The seatbelt harness 22 is releasably engaged with the lap belt portion of the seatbelt harness 22. Specifically, the seatbelt assembly 80 is positioned in a buckled position with the ALR activated for use of the seatbelt harness 22. As an example, the seatbelt assembly 80 may be positioned in the buckled system and the ALR may be activated prior to engagement of the seatbelt harness 22 with the webbing 82. In the buckled position, the tongue 86 of the seatbelt assembly 80 is engaged with the buckle 84 of the seatbelt assembly 80. As set forth above, in the example shown in FIGS. 1 and 4, for example, the ALR mode is activated so that no webbing 82 is paid out of the retractor.

Figure 4:
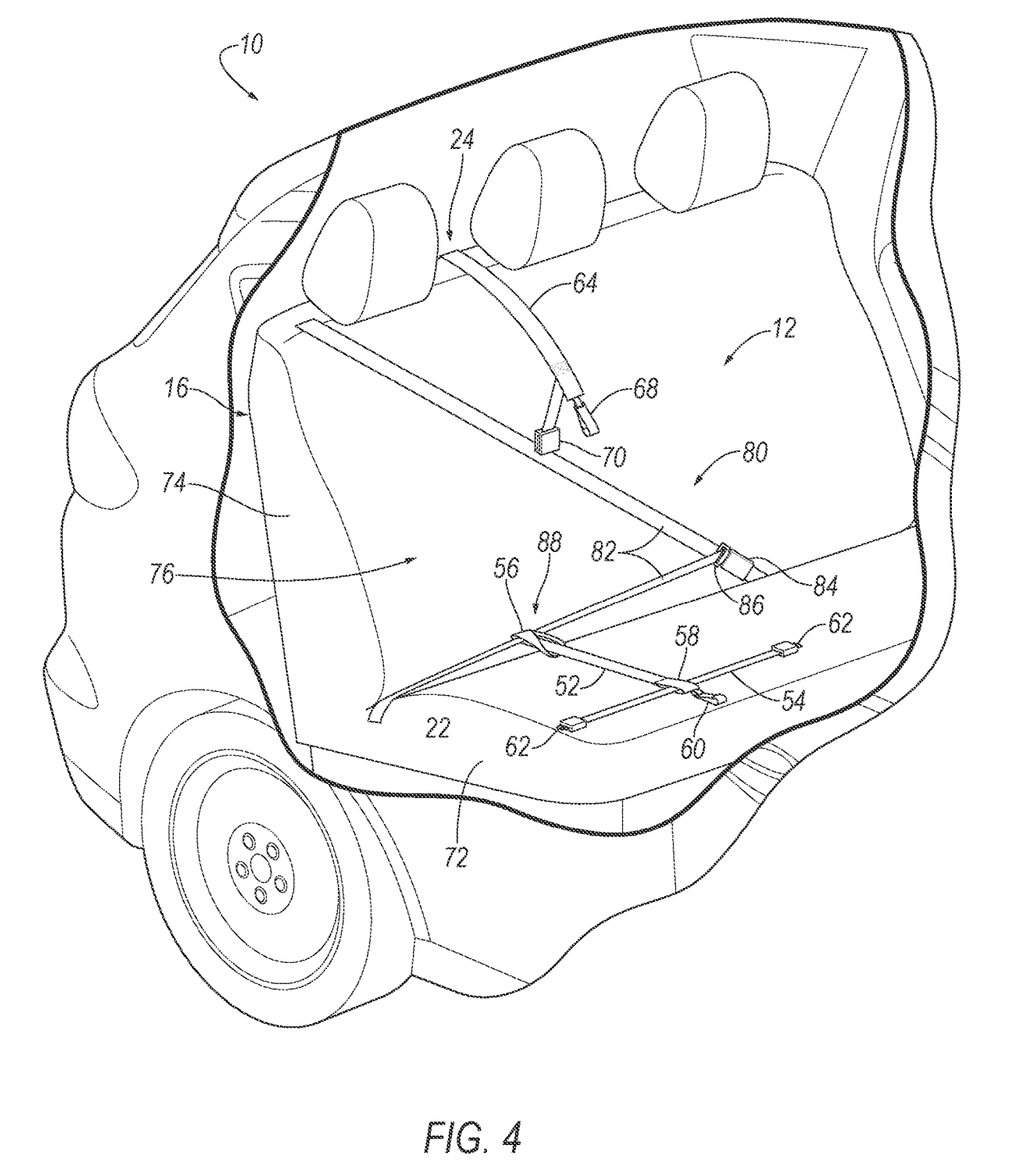
FIG. 4 is a perspective view of the vehicle with the seatbelt harness and the seatback harness engaged with the vehicle.

The seatbelt harness 22 includes a first strap 52 and a second strap 54 slideably engaged with the first strap 52, as shown in FIG. 4. The first strap 52 is releasably engageable with the seatbelt webbing 82 and the second strap 54 is releasably engageable with the seatback harness 24, as described further below. The straps of the seatbelt harness 22 may be, for example, fabric such as woven polyester.

Figure 1:
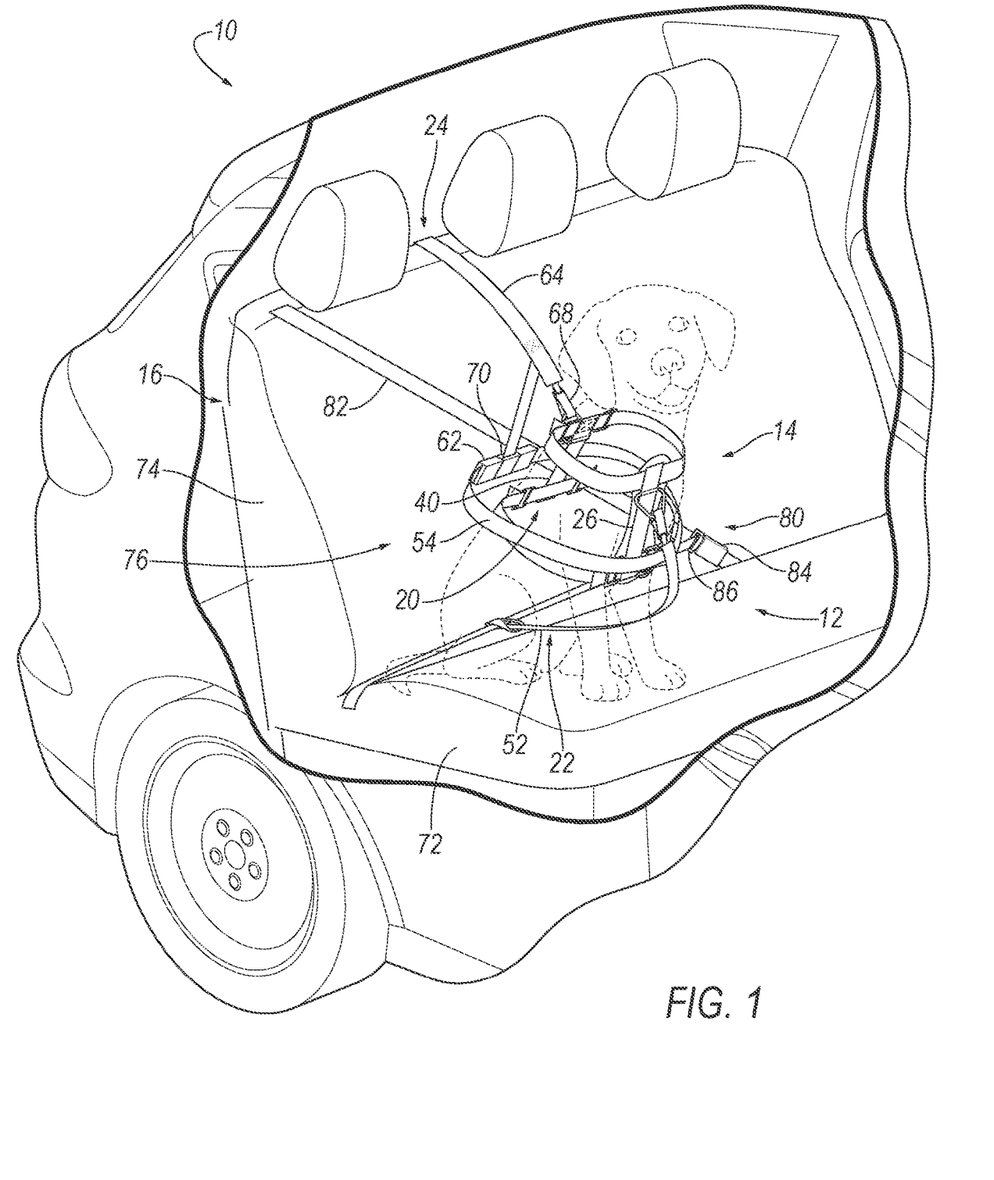
FIG. 1 is a perspective view of a vehicle with a dog harness assembly engaged with a dog.
Figure 2A:
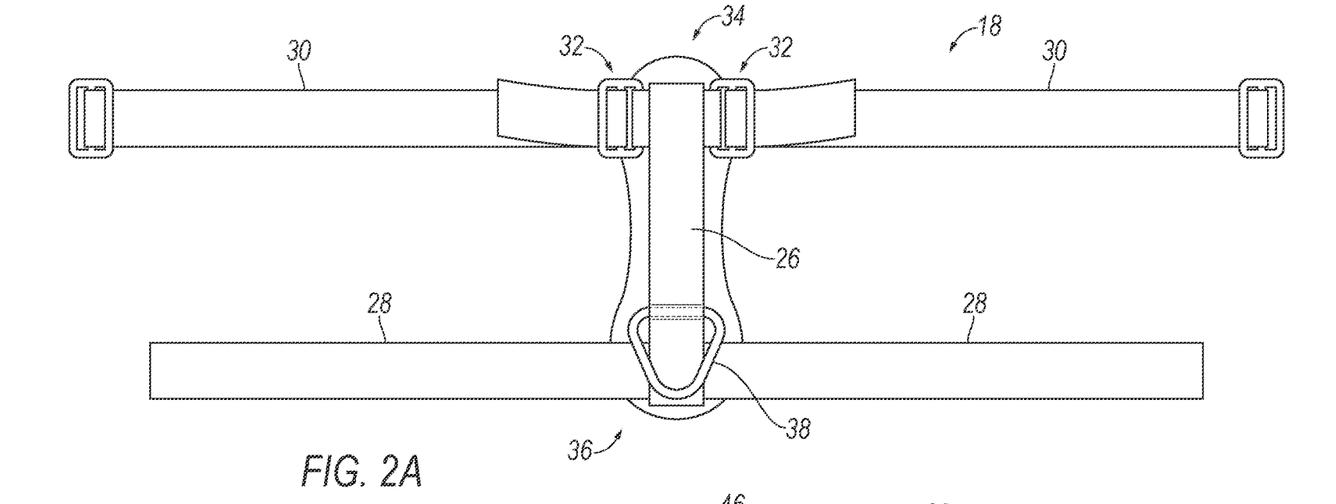
FIG. 2A is a plan view of a bottom segment of a dog harness of the dog assembly while laid flat and not engaged with a dog.
Figure 2B:
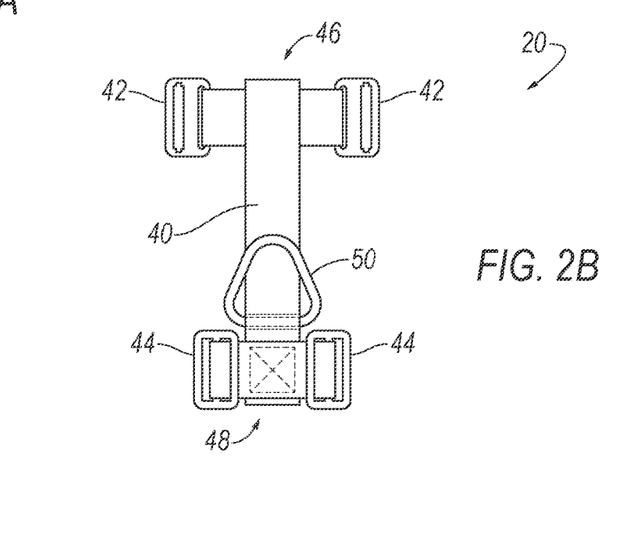
FIG. 2B is a plan view of a top segment of the dog harness while laid flat and not engaged with a dog.
Figure 2C:
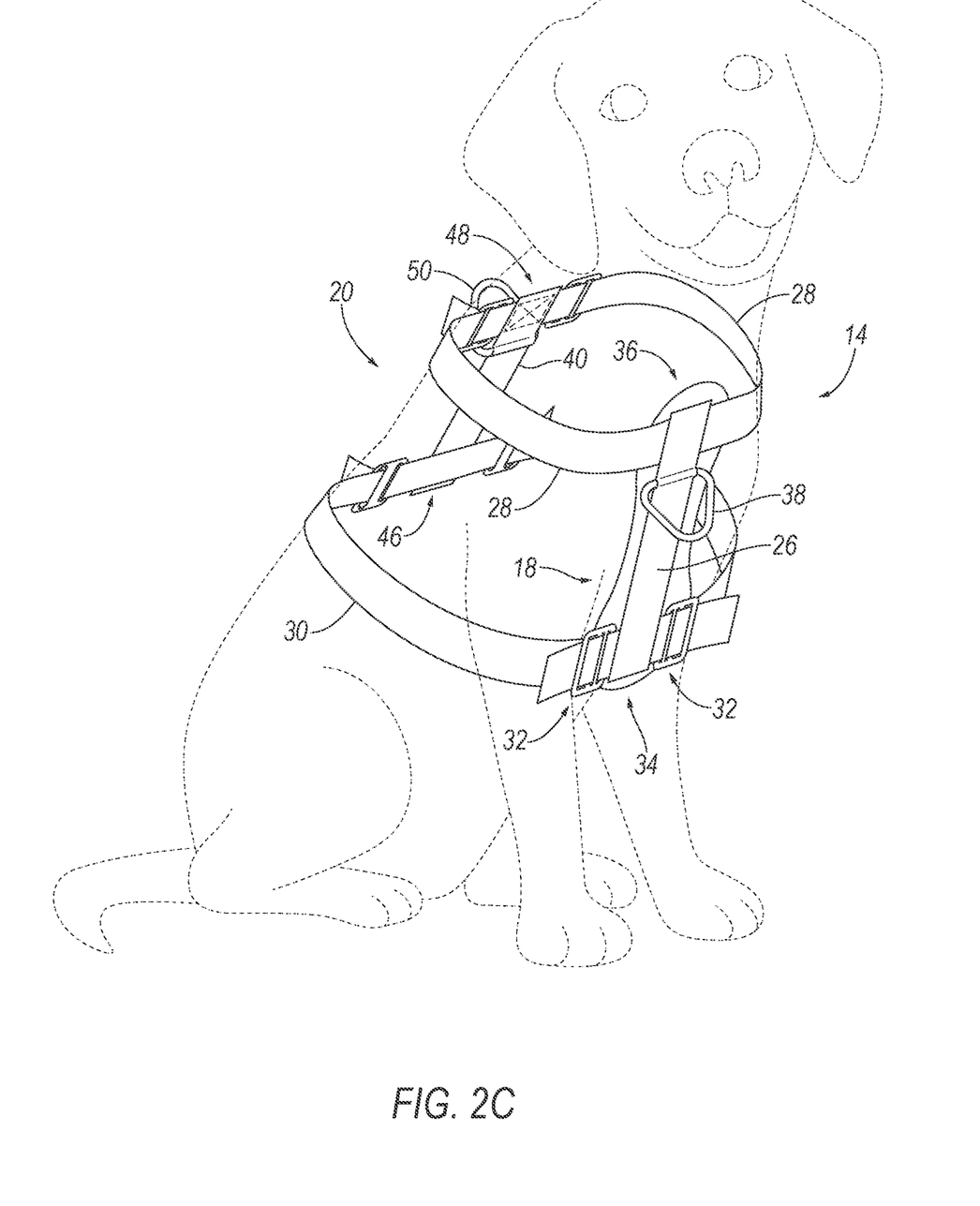
FIG. 2C is a perspective view of the dog harness on a dog.
Figure 3A:
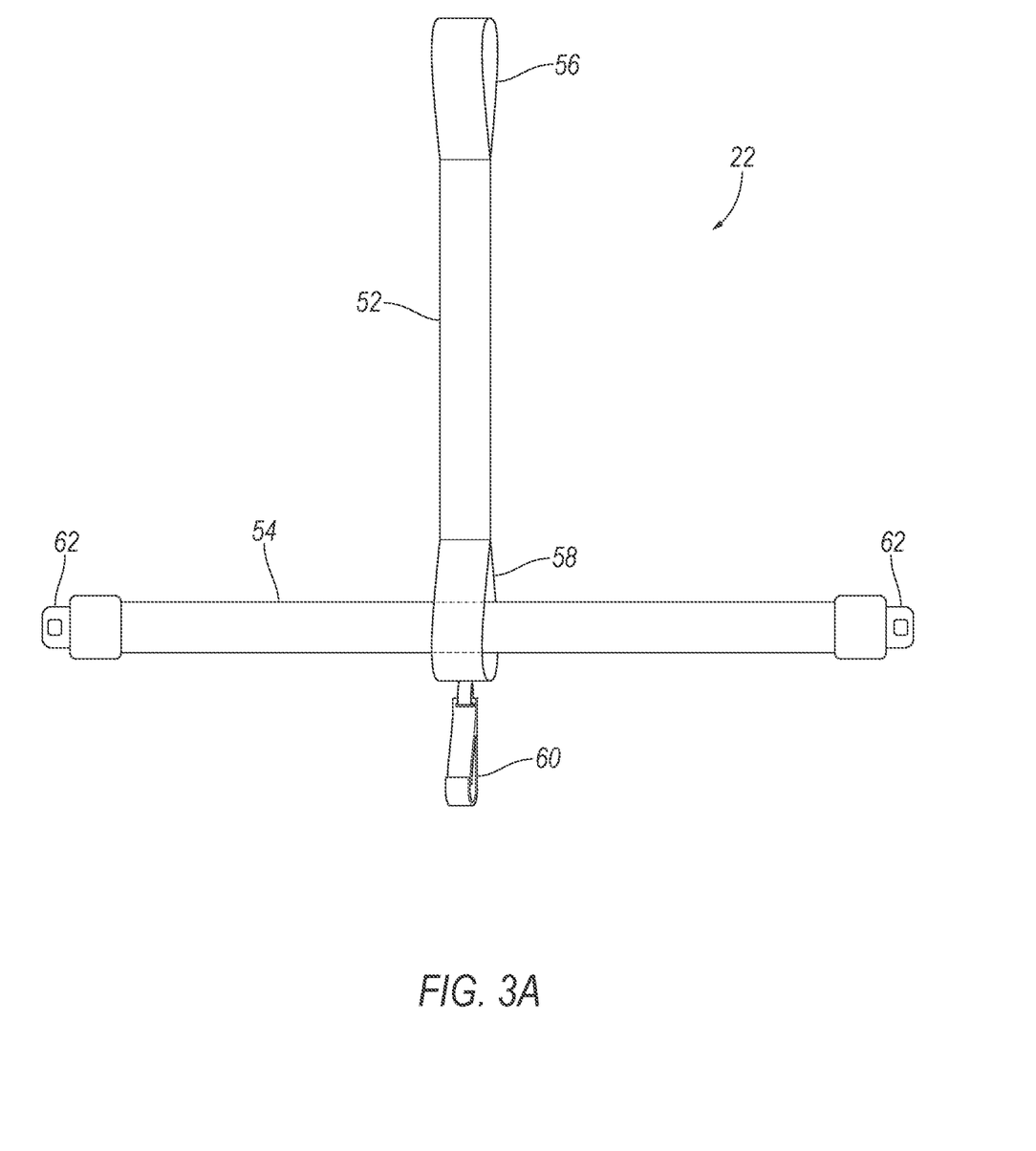
FIG. 3A is a plan view of a seatbelt harness of the dog harness assembly while laid flat and not engaged with the vehicle.
Figure 3B:
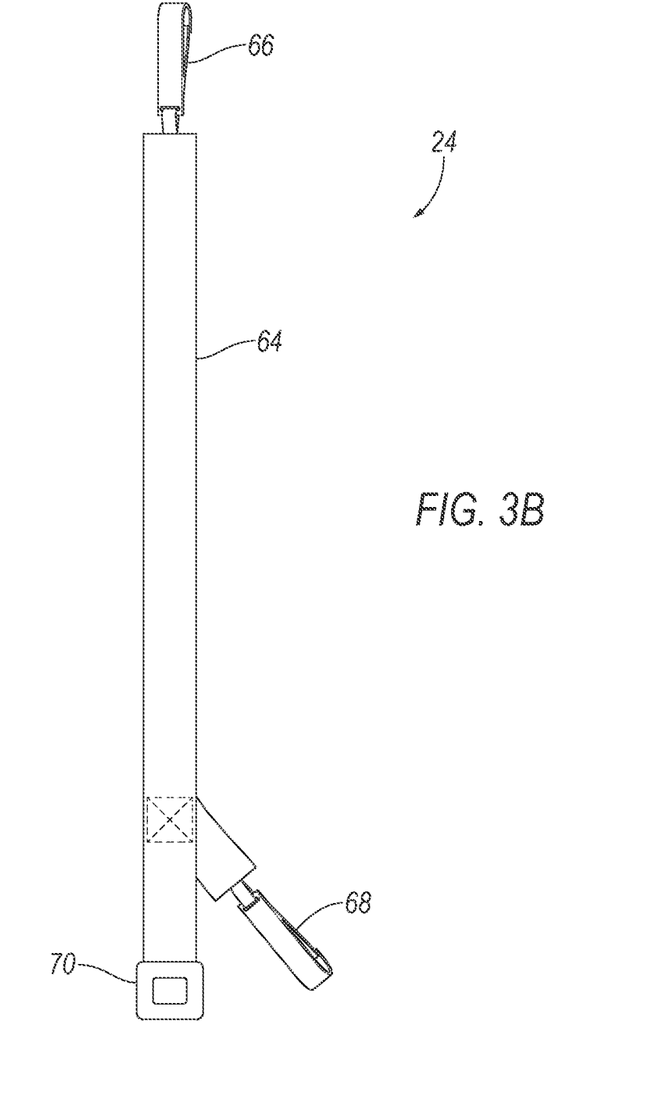
FIG. 3B is a plan view of a seatback harness of the dog harness assembly while laid flat and not engaged with the vehicle.

As set forth above, the seatbelt harness 22 is releasably engageable with a seatbelt webbing 82. A first loop 56 and a second loop 58 are on the first strap 52. The first loop 56 is engageable with the seatbelt webbing 82 to releasably engage the seatbelt harness 22 to the seatbelt webbing 82. Specifically, the loop may be place under the seatbelt webbing 82 the second loop 58 may be fed through the first loop 56 over the seatbelt webbing 82. The second loop 58 and the second strap 54 are then pulled through the first loop 56, as shown in FIGS. 1 and 4. In other words, the first strap 52 is wrapped around the seatbelt webbing 82 and extends through the first loop 56 to releasably engage the seatbelt harness 22 to the seatbelt. The seatbelt harness 22 may be removed from the seatbelt webbing 82 by reversing the previous steps. In other examples, the seatbelt harness 22 may be releasably engaged with the seatbelt webbing 82 in any suitable way, e.g., clips, buckles, etc.

The seatbelt harness 22 is slideably engageable with the seatbelt webbing 82, and specifically is slideably engageable with the lap belt portion of the seatbelt webbing 82. Accordingly, the seatbelt harness 22 may be moved along the seatbelt webbing 82 to a desired position along the seatbelt webbing 82. Specifically, the seatbelt harness 22 may be moved along the lap belt portion to a desired position of the lap belt portion. This allows for greater range of motion for attachment of the dog to the seatbelt harness 22 and also provides range of motion for the dog to be comfortably seated on the seat.

The seatbelt harness 22 has a strap and a connector 88 slideably engageable with the webbing 82 of the seatbelt assembly 80. Specifically, in the example shown in the Figures, the connector 88 is the first strap 52 fed through the first loop 56, as described above and as shown in FIG. 4. The first strap 52 and first loop 56 are slideably engaged with the webbing 82 of the seatbelt assembly 80 when the first strap 52 is fed through the first loop 56 as described above. Specifically, since the first strap 52 is fed through the first loop 56 to engage the seatbelt harness 22 to the seatbelt webbing 82, this looped engagement allows for the seatbelt harness 22 to slide along the seatbelt webbing 82.

The clip 60 of the seatbelt harness 22 is releasably engageable with the chest strap 26 of the dog harness 14. Specifically, as set forth above, the clip 60 of the seatbelt harness 22 is releasably engageable with the ring 38 on the upper end 36 of the chest strap 26 of the dog harness 14. In the example shown in the Figures, the clip 60 of the seatbelt harness 22 is a J-hook spring clip. In other examples, the clip 60 may be of any suitable type.

The seatback harness 24 is releasably engaged with the child seat anchor 78 and is releasably engageable with the dog harness 14, specifically the back strap 40 of the top segment 20 of the dog harness 14. In use, the seatback harness 24 may be released from the dog harness 14 to allow the dog to exit the vehicle 10. At the option of the dog handler, the seatback harness 24 may remain in the vehicle 10 and engaged with the child seat anchor 78 for future use. In such a future use, the dog harness 14 may be re-engaged with the seatback harness 24 to, in part, secure the dog to the vehicle 10 seat. The straps of the seatback harness 24 may be, for example, fabric such as woven polyester.

Figure 5:
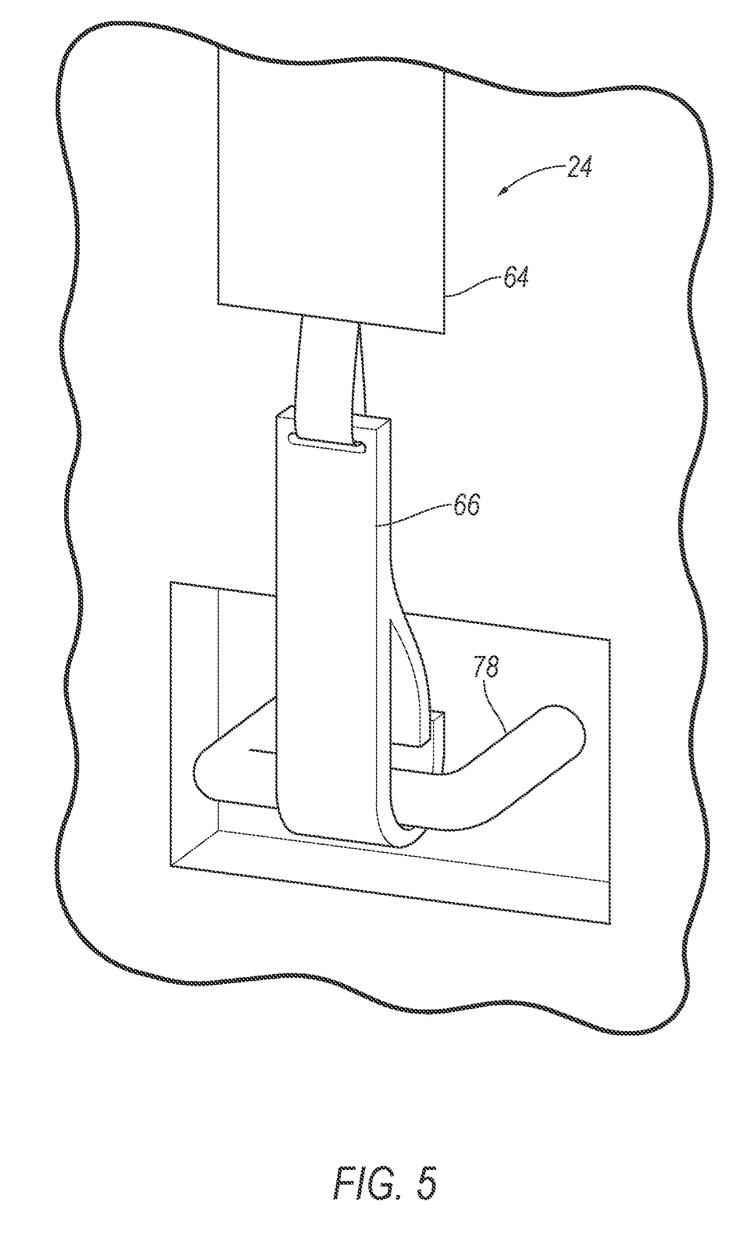
FIG. 5 is a perspective view of the connection of the seatback harness to a seatback of the vehicle.

As set forth above, the seatback harness 24 is releasably engageable with the child seat anchor 78 of a vehicle 10, as shown in FIG. 5. In the example shown in FIG. 5, the seatback harness 24 is releasably engaged with the child seat anchor 78 with a clip 68, e.g., a J-hook spring clip as shown in the example in FIG. 5. In other examples, the seatback harness 24 may be releasably engaged with the child seat anchor 78 with any suitable hardware.

As set forth above, the seatback harness 24 has the clip 68 releasably engageable with the back strap 40 of the dog harness 14. Specifically, as set forth above, the clip 68 of the seatback harness 24 is releasably engageable with the ring 50 on the upper end 48 of the back strap 40 of the dog harness 14. In the example shown in the Figures, the clip 68 of the seatback harness 24 is a J-hook spring clip. In other examples, the clip 68 may be of any suitable type.

As set forth above, the seatbelt harness 22 is releasably engageable with the seatback harness 24. In the example shown in the Figures, the seatback harness 24 includes a buckle 70 and the tongues 62 are connected to the second strap 54 of the seatbelt harness 22. The tongues 62 are releasably engageable with the buckle 70 of the seatback harness 24.

The buckle 70 and the tongues 62 may be, for example, of the type currently known. As an example, the seatbelt buckle 70 may include, for example, two slot (one for each tongue 62), a latch member, a release button, and/or other suitable structure. The release button may be spring loaded. The tongue 62 may be engaged with the buckle 70 upon insertion of the tongue 62 into the slot. For example, the latch member of the buckle 70 engages an opening defined by the tongue 62 and inhibits removal of the tongue 62 from the slot. Actuation of the release button on the buckle 70 disengages the latch member of the buckle 70 from the tongue 62. For example, depression of the release button disengages the latch member from the opening defined by the latch and permits removal of the tongue 62 from the slot of the buckle 70. The release button may simultaneously release both tongue 62 from the buckle 70.

The second strap 54 is designed to encircle the dog between the seatbelt harness 22 and the seatback harness 24. In other words, when the tongues 62 are engaged with the buckle 70, the second strap 54, the tongues 62, and the buckle 70, in combination, extend endlessly around the body of the dog.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle seat assembly comprising:
a vehicle seat having a seatback and a seatbelt assembly;
a child seat anchor;

the seatbelt assembly having a webbing, a buckle, and a clip slideable on the webbing and releasably engageable with the buckle;

a dog harness having a chest strap and a back strap releasably engageable with the chest strap around a dog;

a seatbelt harness releasably engageable with the seatbelt webbing; and a seatback harness releasably engageable with the child seat anchor;

the seatbelt harness having a clip releasably engageable with the chest strap of the dog harness and the seatback harness having a clip releasably engageable with the back strap of the dog harness;

the seatbelt harness includes a first strap releasably engageable with the seatbelt webbing and a second strap slideably engaged with the first strap, the second strap being releasably engageable with the seatback harness; and the second strap is designed to encircle the dog between the seatbelt harness and the seatback harness.

2. The vehicle seat assembly of claim 1, wherein the seatback harness includes a buckle and the second strap of the seatbelt harness includes tongues releasably engageable with the buckle of the seatback harness.

3. The vehicle seat assembly of claim 1, wherein the seatbelt harness is slideably engageable with the webbing of the seatbelt assembly.

4. The vehicle seat assembly of claim 1, wherein the seatbelt harness has a connector slideably engageable with the webbing of the seatbelt assembly.

5. The vehicle seat assembly of claim 4, further comprising a ring on the chest strap, the clip of the seatbelt harness being releasably engageable with the ring on the chest strap.

6. The vehicle seat assembly of claim 5, wherein the seatback harness includes a buckle and the seatbelt harness includes tongues releasably engageable with the buckle of the seatback harness.

7. The vehicle seat assembly of claim 1, further comprising side straps between the chest strap and the back strap and releasably engageable with at least one of the chest strap and the back strap.

8. The vehicle seat assembly of claim 7, wherein the side straps between the chest strap and the back strap are designed to encircle the dog between the chest strap and the back strap.

9. The vehicle seat assembly of claim 1, further comprising a ring on the chest strap and a ring on the back strap, the clip of the seatbelt harness being releasably engageable with the ring on the chest strap and the clip of the seatback harness being releasably engageable with the ring on the back strap.

10. The vehicle seat assembly of claim 9, wherein the ring on the chest strap is at an upper end of the chest strap and the ring on the back strap is at an upper end of the back strap.

11. A dog harness assembly comprising:

a dog harness having a chest strap and a back strap, the back strap releasably engageable with the chest strap around a dog;

a seatbelt harness releasably engageable with a seatbelt webbing of a vehicle; and a seatback harness releasably engageable with a child seat anchor of a vehicle;

the seatbelt harness having a clip releasably engageable with the chest strap and the seatback harness having a clip releasably engageable with the back strap;

the seatbelt harness including a first strap releasably engageable with the seatbelt webbing and a second strap slideably engaged with the first strap, the second strap being releasably engageable with the seatback harness; and the second strap is designed to encircle the dog between the seatbelt harness and the seatback harness.

12. The dog harness assembly of claim 11, further comprising a ring on the chest strap and a ring on the back strap, the clip of the seatbelt harness being releasably engageable with the ring on the chest strap and the clip of the seatback harness being releasably engageable with the ring on the back strap.

13. The dog harness assembly of claim 12, wherein the seatback harness includes a buckle and the second strap of the seatbelt harness includes tongues releasably engageable with the buckle of the seatback harness.

14. The dog harness assembly of claim 11, further comprising straps between the chest strap and the back strap and releasably engageable with at least one of the chest strap and the back strap.

15. The dog harness assembly of claim 14, wherein the straps between the chest strap and the back strap are designed to encircle the dog between the chest strap and the back strap.

* * * * *